United States Patent [19]
Miyaoka

[11] Patent Number: 5,953,289
[45] Date of Patent: Sep. 14, 1999

[54] MAGNETO-OPTICAL RECORDING-REPRODUCING METHOD UTILIZING DOMAIN WALL DISPLACEMENT, AND APPARATUS THEREFOR

[75] Inventor: Yasuyuki Miyaoka, Yokohama, Japan

[73] Assignee: Canon Kabushiki Kaisha, Tokyo, Japan

[21] Appl. No.: 09/086,308

[22] Filed: May 27, 1998

[30] Foreign Application Priority Data

May 28, 1997 [JP] Japan ..................................... 9-138582

[51] Int. Cl.⁶ ....................................................... G11B 11/00
[52] U.S. Cl. ............................................. 369/13; 369/116
[58] Field of Search .............................. 369/13, 14, 100, 369/99, 107, 116, 275.2, 283, 110, 124; 360/59, 114

[56] References Cited

U.S. PATENT DOCUMENTS 5,091,897  2/1992  Otokawa et al. ........................... 369/13
5,223,578  6/1993  Yamamoto et al. ....................... 369/13

FOREIGN PATENT DOCUMENTS 6-290496  10/1994  Japan .

*Primary Examiner*—Ali Neyzari
*Attorney, Agent, or Firm*—Fitzpatrick, Cella, Harper & Scinto

[57] ABSTRACT

A method for reproducing information on a magneto-optical medium comprises causing temperature distribution on the magneto-optical medium by projection of a light beam and displacing domain walls by the temperature gradient, wherein a detected reproduction signal is corrected by subtraction therefrom of a signal derived by delaying the detected reproduction signal by a prescribed time $\beta$ and multiplying the delayed signal by an amplitude gain $\alpha$. An apparatus for reproducing information on a magneto-optical medium with regard to the above method comprises a first circuit for generating reproduced signals from reflection of the light beam, a second circuit for generating a modified signal derived by delaying the reproduction signal by a prescribed delay time $\beta$ and multiplying an amplitude gain $\alpha$, and a third circuit for subtracting the modified signal from the reproduced signal.

7 Claims, 11 Drawing Sheets

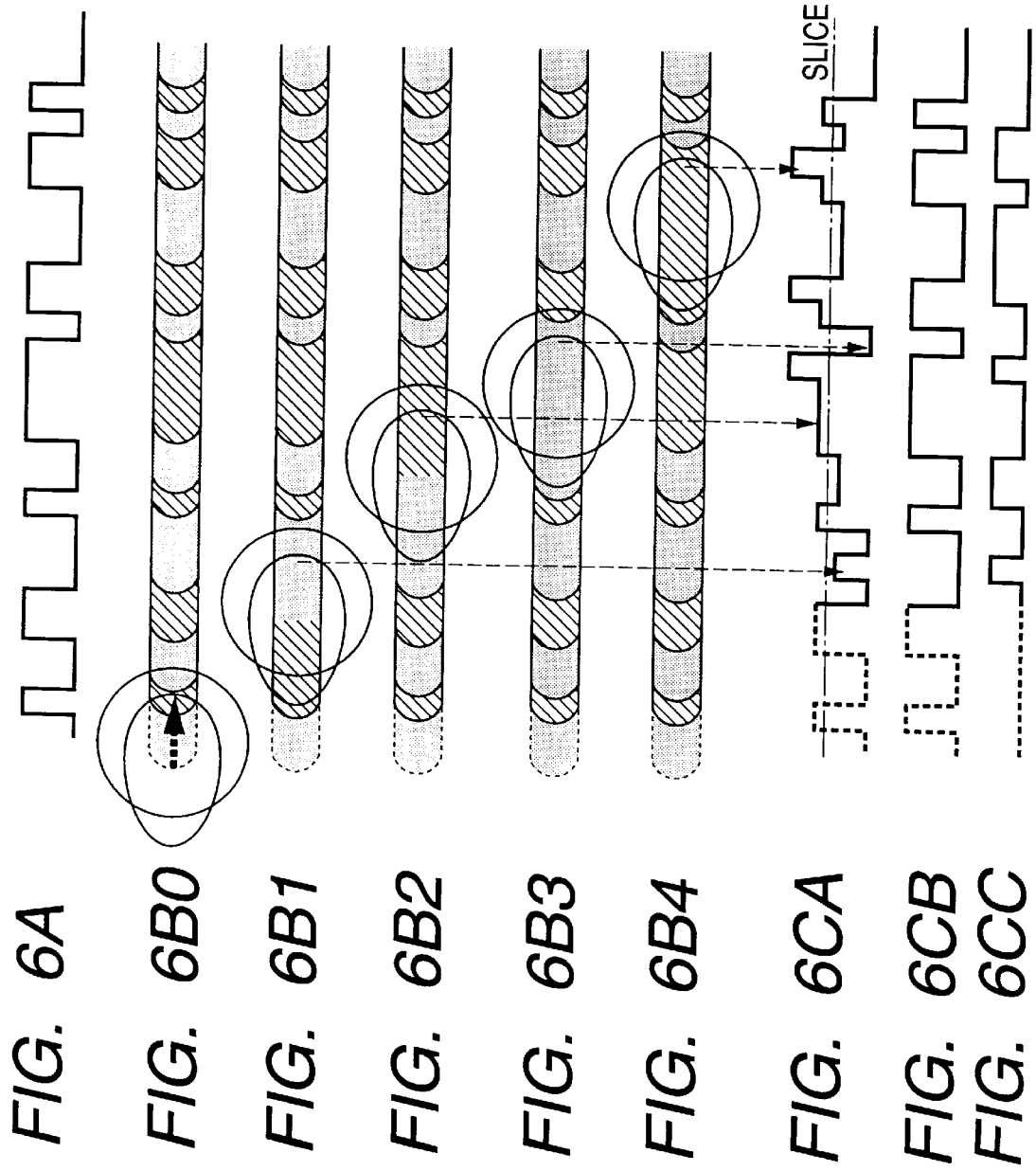

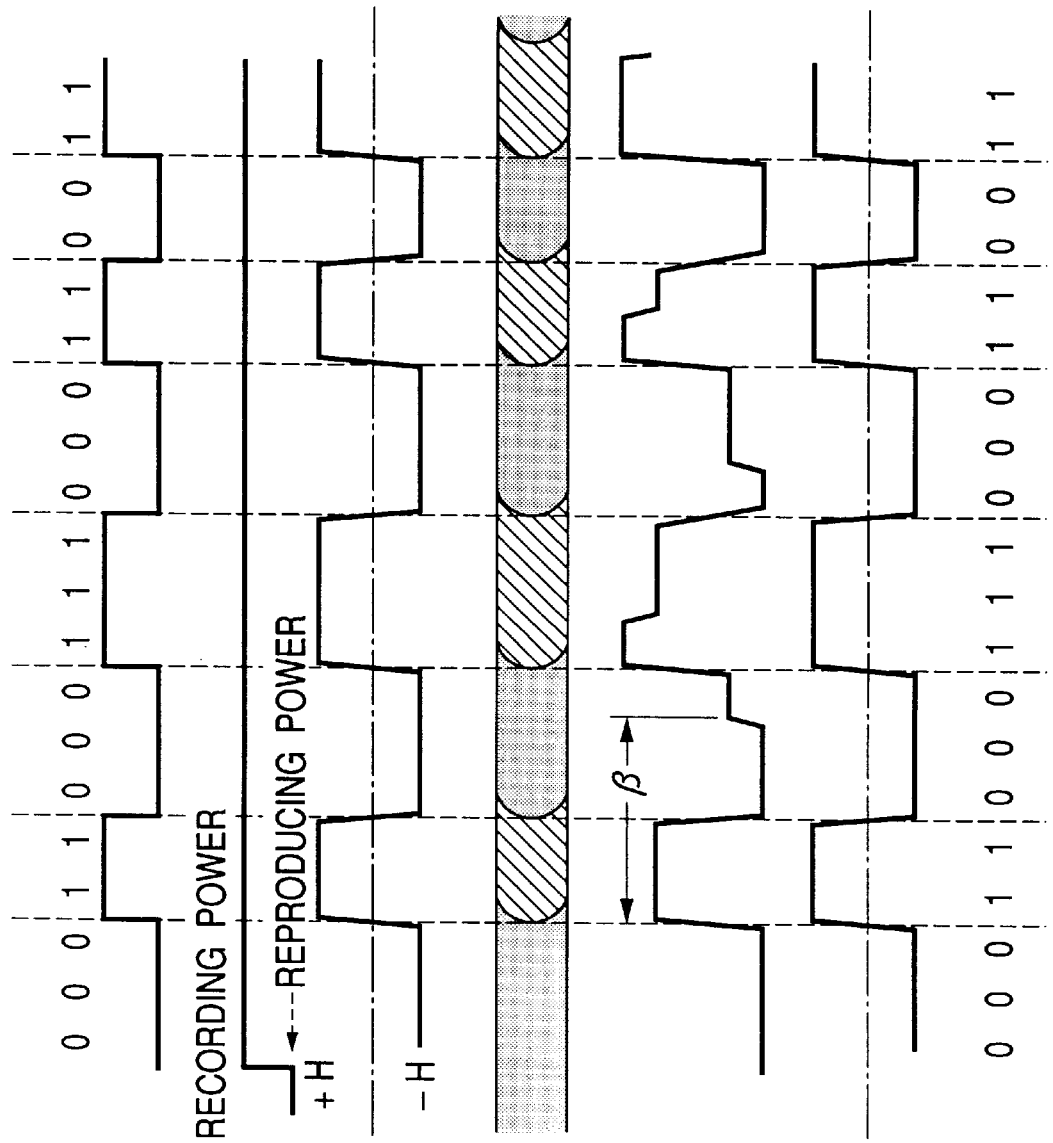

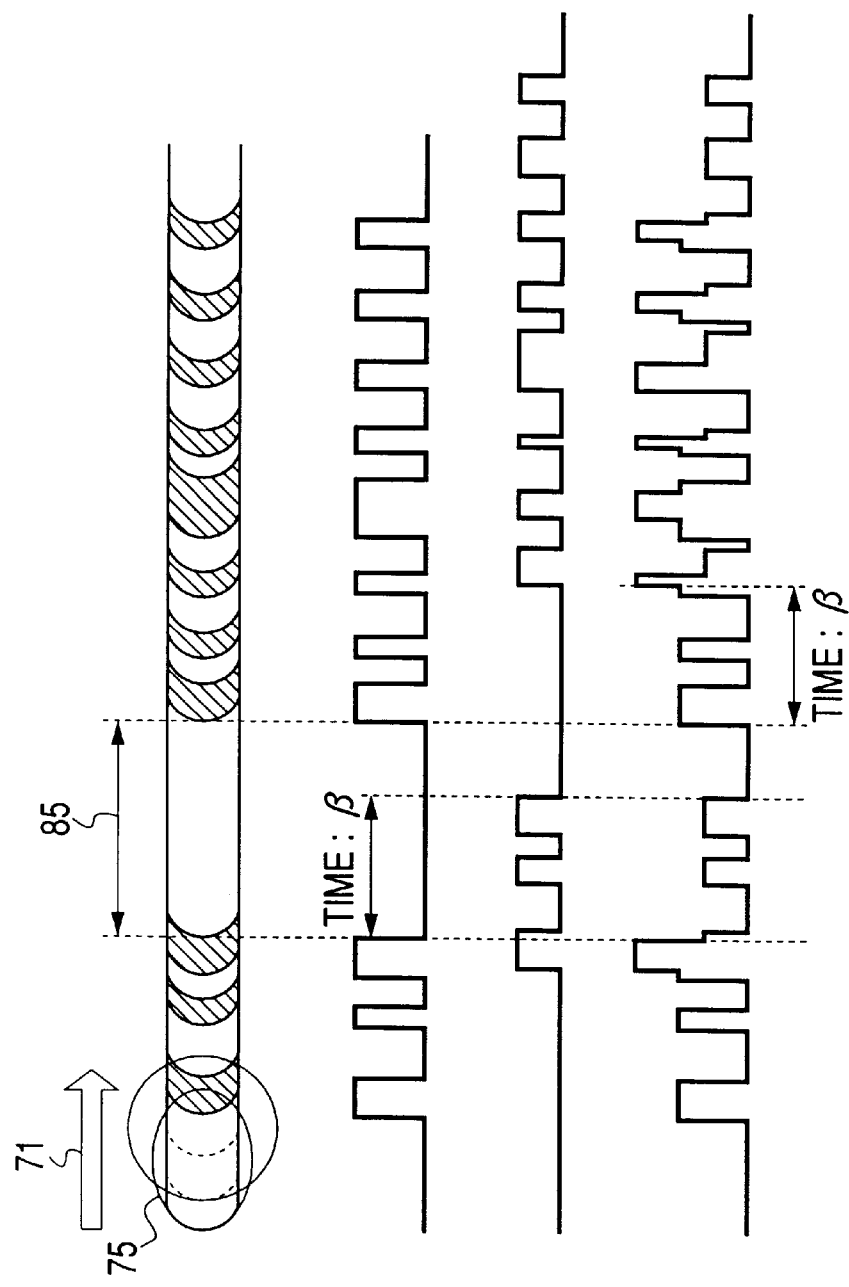

MAGNETO-OPTICAL RECORDING-REPRODUCING METHOD UTILIZING DOMAIN WALL DISPLACEMENT, AND APPARATUS THEREFOR

BACKGROUND OF THE INVENTION

1. Field of the Invention

The present invention relates to a magneto-optical recording-reproducing method comprising projecting a light beam on a magneto-optical medium of a multi-layer structure, displacing a domain wall of a record mark in a displacement layer without change of recorded data in a memory layer by utilizing temperature gradient in temperature distribution, and detecting a change of polarization direction of the reflected light beam to reproduce the record mark of less than light diffraction limit. The present invention relates also to a magneto-optical recording-reproducing apparatus employing the above method.

2. Related Background Art

Magneto-optical mediums for rewritable high-density recording are known which record information by forming magnetic domains in a magnetic thin film by utilizing thermal energy of a semiconductor laser and read out the information by utilizing a magneto-optical effect. In recent years, higher recording density of the magneto-optical medium is demanded. In an optical disk such as magneto-optical medium, the linear recording density depends greatly on the laser wavelength and the numerical aperture of the objective lens of the reproducing optical system. More specifically, the laser wavelength $\lambda$ and the numerical aperture NA of the objective lens of the reproducing optical system decide the diameter of the beam waist, whereby the detectable range of the spatial frequency of record mark reproduction is limited to about $2NA/\lambda$. Therefore, for achieving higher recording density with a conventional optical disk, the laser wave length should be shorter and the NA of the objective lens should be larger in the reproducing optical system. However, the improvements in the laser wavelength and the numerical aperture of the objective lens is limited naturally.

For further higher recording density, the constitution of the recording medium and the reading method are being improved. For example, Japanese Patent Laid-Open No. 06-290496 discloses a signal-reproducing method and an apparatus therefor, in which signals are recorded in a multi-layered film having a displacement layer and a record-storing layer coupled magnetically, and the record marks of less than the light diffraction limit is reproduced by displacing the domain wall of record marks in the displacement layer by utilizing a temperature gradient caused by irradiation of heating light beam without changing recorded data in the record-storing layer, magnetizing uniformly and almost entirely the light beam spot region on the displacement layer, detecting the change of polarization direction of the reflected light beam. This method reproduces signals in a rectangle form as shown in FIG. 2E, which enables reproduction of record marks of frequency of less than optical diffraction limit without decreasing the reproduction signal amplitude. Thereby, the medium and method for the magneto-optical recording are greatly improved in the recording density and the transfer speed.

FIG. 1 shows a constitution of a conventional system. In FIG. 1, magneto-optical disk 1 is constituted of substrate 2, magneto-optical layer 3 formed thereon, and protection layer 4 formed further thereon. Substrate 2 is formed from glass or a plastic material. Magneto-optical layer 3 is capable of reproducing record marks of less than optical diffraction limit by shifting a domain wall by utilizing temperature gradient caused by light beam irradiation without changing recorded data in the record-storing layer, magnetizing uniformly and almost entirely the light beam spot region on the displacement layer, and detecting the change of polarization direction of the reflected light beam. Magneto-optical disk 1 is fixed to a spindle motor by a magnet chucking or a like means to be rotatable on a rotation axis.

Parts 5 to 17 constitute an optical head for projecting a laser beam to magneto-optical disk 1 and for receiving information from reflected light. The parts comprise condenser lens 6 as an objective lens, actuator 5 for driving condenser lens 6, semiconductor laser 7 of a wavelength of 680 nm for record reproduction, semiconductor laser 8 of wavelength of 1.3 $\mu$m for heating, collimator lenses 9,10, dichroic mirror 11 for completely transmitting light of 680 nm and completely reflecting light of 1.3 $\mu$m, beam splitter 12, dichroic mirror 13 for intercepting light of 1.3 $\mu$m and completely transmitting light of 680 nm to prevent leakage of light of 1.3 $\mu$m into the signal detecting system, $\lambda/2$ plate 14, polarized light beam splitter 15 for splitting the laser beam according to polarization angles into two directions, photosensors 17, condenser lenses 16 for photosensor, and differential amplification circuit 18 for differentially amplifying the condensed and detected signals for respective polarization direction.

The laser beams of 680 nm and 1.3 $\mu$m emitted respectively from semiconductor lasers 7,8 for recording-reproducing and heating are introduced through collimator lenses 9,10, dichroic mirror 11, beam splitter 12, and condenser lens 6 to magneto-optical disk 1. Condenser lens 6 moves in the focusing direction and the tracking direction under control by actuator 5 to focus the laser beams successively on magneto-optical layer 3 by tracking along a guiding groove formed on magneto-optical disk 1. The light flux of 1.3 $\mu$m is made smaller than the aperture diameter of condenser lens 6 to make the NA smaller than that of the light of 680 nm which is condensed through the entire area of the aperture.

The heating spot, which is formed with a larger wavelength and a smaller NA, has a larger diameter of heating beam 74 than the recording-reproducing spot of recording-reproducing beam 73 as shown in FIGS. 3A and 3B. Ts isotherm is indicated by numeral 75. Thereby, a desired temperature gradient is formed in the recording-reproducing spot region on the moving disk face as shown in FIG. 3D. The laser beam reflected by magneto-optical disk 1 is deflected by beam splitter 12 to the optical path toward polarized light beam splitter 15, and travels through dichroic mirror 13, $\lambda/2$ plate 14, and polarized light beam splitter 15. The split light beams are respectively condensed by lenses 16 onto sensors 17 corresponding to magnetization polarity of the spot on magneto-optical layer 3. The condensed light beams are composed only of 680 nm light since dichroic mirror 13 intercepts the 1.3 $\mu$m light. The outputs from the respective photosensors 17 are amplified differentially by differential amplifier 18 to output the magneto-optical signals from terminal 90. Controller 20 receives information on rotation rate of magneto-optical disk 1, recording radius, recording sectors, and so forth and outputs recording power for LD (Laser Diode) power setting, and recording signals to control LD driver 19, and magnetic head driver 24. LD driver 19 drives semiconductor lasers 7,8. In this example, LD driver applies recording power and reproducing power to semiconductor laser 7, and heating beam power to semiconductor laser 8 to control them.

Magnetic head 23 applies a modulation magnetic field onto the laser irradiation site on magneto-optical disk 1 for the recording operation. Magnetic head 23 is placed in opposition to condenser lens 6 with interposition of magneto-optical disk 1. During recording, recording-reproducing semiconductor laser 7 applies recording laser power by DC (Direct Current) light irradiation, and synchronously magnetic head 23 produces magnetic fields of different polarities under control by magnetic head driver 24 in correspondence with the recording signals. Magnetic head 23 moves with the optical head in a radius direction of magneto-optical disk, and applies a magnetic field successively on recording onto the laser irradiation site of magneto-optical layer 3. Magneto-optical layer 3 is constituted of three layers of a displacement layer, a switching layer, and a memory layer, each having a domain wall structure shown by arrow marks.

The recording-reproducing operation is explained by reference to FIGS. 2A to 2F. FIG. 2A shows recording signals, FIG. 2B a recording power, FIG. 2C modulating magnetic fields, FIG. 2D record marks, FIG. 2E reproducing signals, and FIG. 2F binary digit signals. In recording of the recording signals as shown in FIG. 2A, the power of semiconductor laser 7 is controlled to be at a prescribed level from the start of the recording operation, and modulating magnetic field is applied in accordance with the recording signals. Thereby, record mark sequence is formed in the process of cooling of memory layer as shown in FIG. 2D, where the line-shadowed portions show magnetic domains magnetized in the direction corresponding to the record marks in the present invention, and the dot-shadowed portions show magnetic domains magnetized in the reverse direction.

The reproduction operation is explained below by reference to FIGS. 3A to 3C. Numeral 99 indicates groove, and numeral 100 indicates land. The medium is heated up to a temperature for causing the displacement of the domain wall in the displacement layer of the medium by a heating beam 74. The isotherm 75 of the temperature Ts of the recording medium, which is the main factor for inducing displacement of the domain wall, crosses the beam movement direction 71 in the front portion and in the rear portion of the beam spot. The domain walls are displaced backward from the front portion and forward from the rear portion relative to the heating beam movement direction as shown by the numeral 72 in FIG. 3A. Therefore, the magnetic displacement signals from the front only can be detected by placing record-reproducing beam 73 at the front side of the heating beam-moving direction as shown in FIG. 3B. Similarly, the magnetic displacement signals from the rear only can be detected by placing record-reproducing beam 73 at the rear side of the beam moving directions shown in FIG. 3B.

In either case, the record mark sequence shown in FIG. 2D is reproduced by the record-reproducing beam to give reproduced signals of FIG. 2E, and further giving binary signals shown in FIG. 2F. In the above magneto-optical recording-reproducing method, a light beam is projected to cause displacement of the domain walls of the record marks in the displacement layer by utilizing temperature gradient caused by the light beam without change of the recorded data in the memory layer, and the change of the polarization plane of the reflected light beam is detected to reproduce the record marks. According to this magneto-optical recording-reproducing method, the magnetization states carried by the reproducing beam are the same as shown in FIGS. 3A to 3D. Therefore, the reproduced signals are rectangular, and record marks of less than diffraction limit of the light can be reproduced without decreasing the reproducing signal amplitude. Thereby, a medium for magneto-optical recording and apparatus therefor can be provided which have been improved in recording density and transfer rate.

In FIGS. 3A to 3D, the numeral 77 indicates a switching layer, the numeral 76 indiates a displacement layer, and the numeral 78 indicates a memory layer.

However, the prior art described above has disadvantages of higher cost owing to many optical parts for the heating laser beam, various adjustment steps in assemblage of the apparatus, and two laser system. For solving the problems of the higher cost, the heating and reproduction is required to be conducted with one light beam system.

As shown in FIGS. 5A and 5B, the maximum temperature point in the high temperature region formed by light beam lies in the irradiation range of the light beam. If the heating beam is not employed, the reproduced signal is a synthesized signal formed from two signals: a signal generated by displacement of the domain wall at the front portion of the beam movement direction 71 to the maximum temperature point by temperature gradient, detected at region 81 in FIG. 5A: $f(t)$ ($f(t)=0$ at $t<0$), wherein t denotes a reading-out (reproducing) time of the record mark sequence, and when $t=0$, t denotes a start time of the reading out; and another signal generated by displacement of the domain wall of the rear portion of the beam movement direction to the maximum temperature point by temperature distribution, detected at region 82 in FIG. 5A: $\alpha \cdot 3f(t-\beta)$ ($f(t)=0$ at $t<0$), wherein $\alpha$ denotes an amplitude gain, and $\beta$ denotes a delay time; namely the synthesized signal being represented by $h(t)=f(t)+\alpha \cdot f(t-\beta)$. The numeral 80 indicates a terminal of the domain wall displacement.

For example, when the recorded signal sequence shown in FIG. 6A is reproduced without the employment of the heating beam, the recorded signals are read out, with the movement of the reproduction beam, through the states shown in FIGS. 6B1 to 6B4 to give reproduced signals as shown in FIG. 6CA, which is superposition of the signals generated by domain wall displacement from the front side (FIG. 6CB) and the signals generated by domain wall displacement from the rear side of the optical beam (FIG. 6CC). Therefore, in this case, the recorded information cannot be reproduced with sufficient margin by conventional technique of binarizing with the slice level of the median of repeated reproduction signals of shortest marks employing the amplitude 79 disadvantageously as shown in FIG. 4.

SUMMARY OF THE INVENTION

An object of the present invention is to provide a magneto-optical method for recording and reproducing information with high reliability at low cost.

Another object of the present invention is to provide an apparatus therefor.

The method for reproducing information an a magneto-optical medium comprises causing temperature distribution on the magneto-optical medium by projection of a light beam and displacing domain walls by the temperature distribution, wherein a detected reproduction signal is corrected by subtraction therefrom of a signal derived by delaying the detected reproducing signal by a prescribed delay time $\beta$ and multiplying an amplitude gain $\alpha$.

The apparatus for reproducing information on a magneto-optical medium comprises causing temperature distribution on the magneto-optical medium by projection of a light beam, and displacing domain walls by the temperature distribution, wherein the apparatus comprises a first circuit for generating reproduced signals from reflection of the light beam, a second circuit for generating a signal derived by delaying the reproduction signal by a prescribed delay time β and multiplying an amplitude gain α, and a third circuit for subtracting the delayed signal from the reproduced signal.

BRIEF DESCRIPTION OF THE DRAWINGS

FIGS. 5A and 5B, and FIGS. 6A, 6B0, 6B1, 6B2, 6B3, 6B4, 6CA, 6CB, and 6CC are drawings for explaining problems to be solved by the present invention.

FIGS. 8A, 8B, 8C, 8D, 8E, 8F and 8G are timing charts for explaining operation of a magneto-optical recording-reproducing apparatus of the present invention.

FIGS. 13A, 13B, 13C, and 13D show the principle of operation of another magneto-optical recording-reproducing apparatus of the present invention.

DETAILED DESCRIPTION OF THE PREFERRED EMBODIMENTS

Embodiment 1

Figure 1:
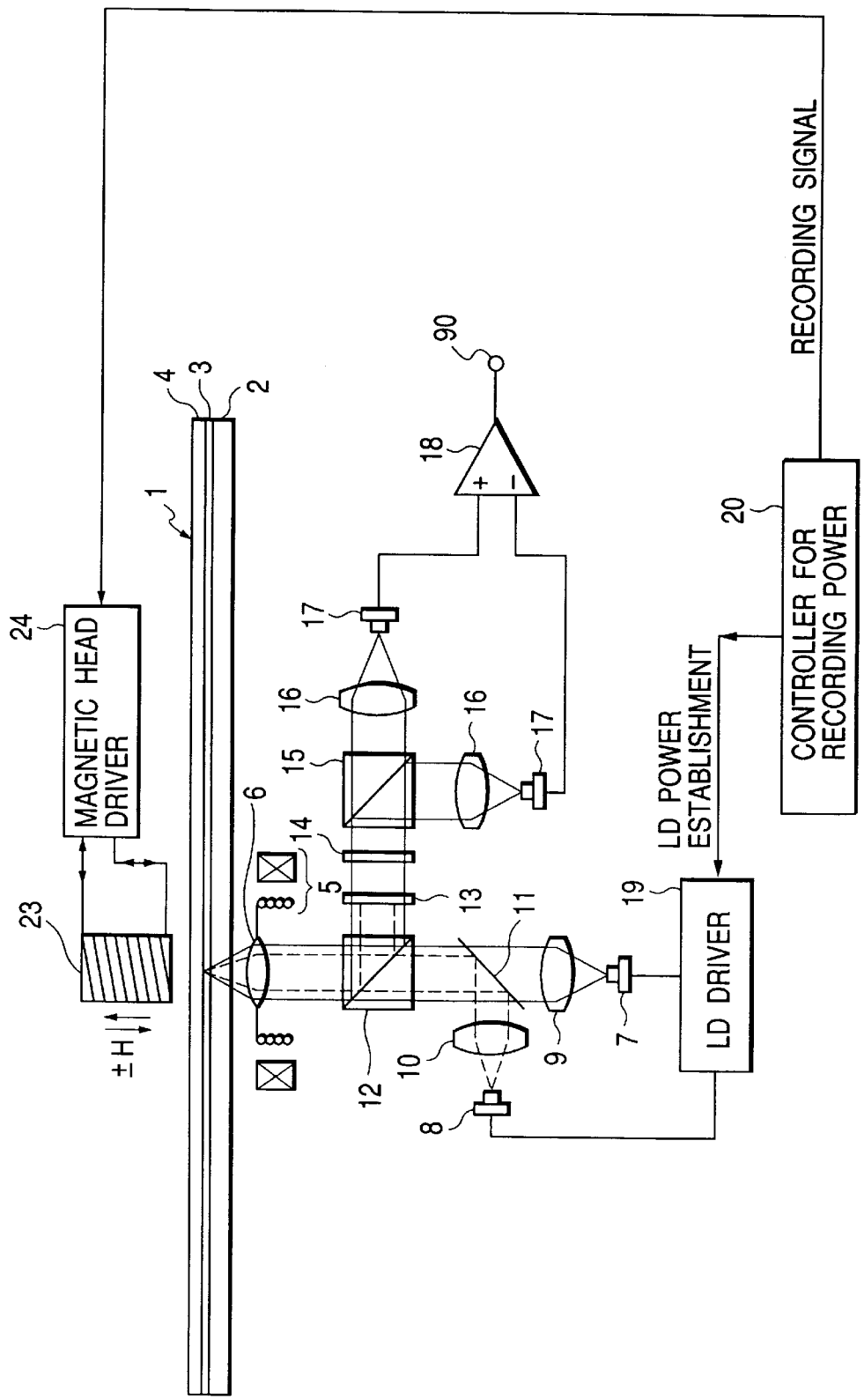
FIG. 1 shows constitution of a conventional magneto-optical recording-reproducing apparatus.
Figures 2A, 2B, 2C, 2D, 2E, 2F:
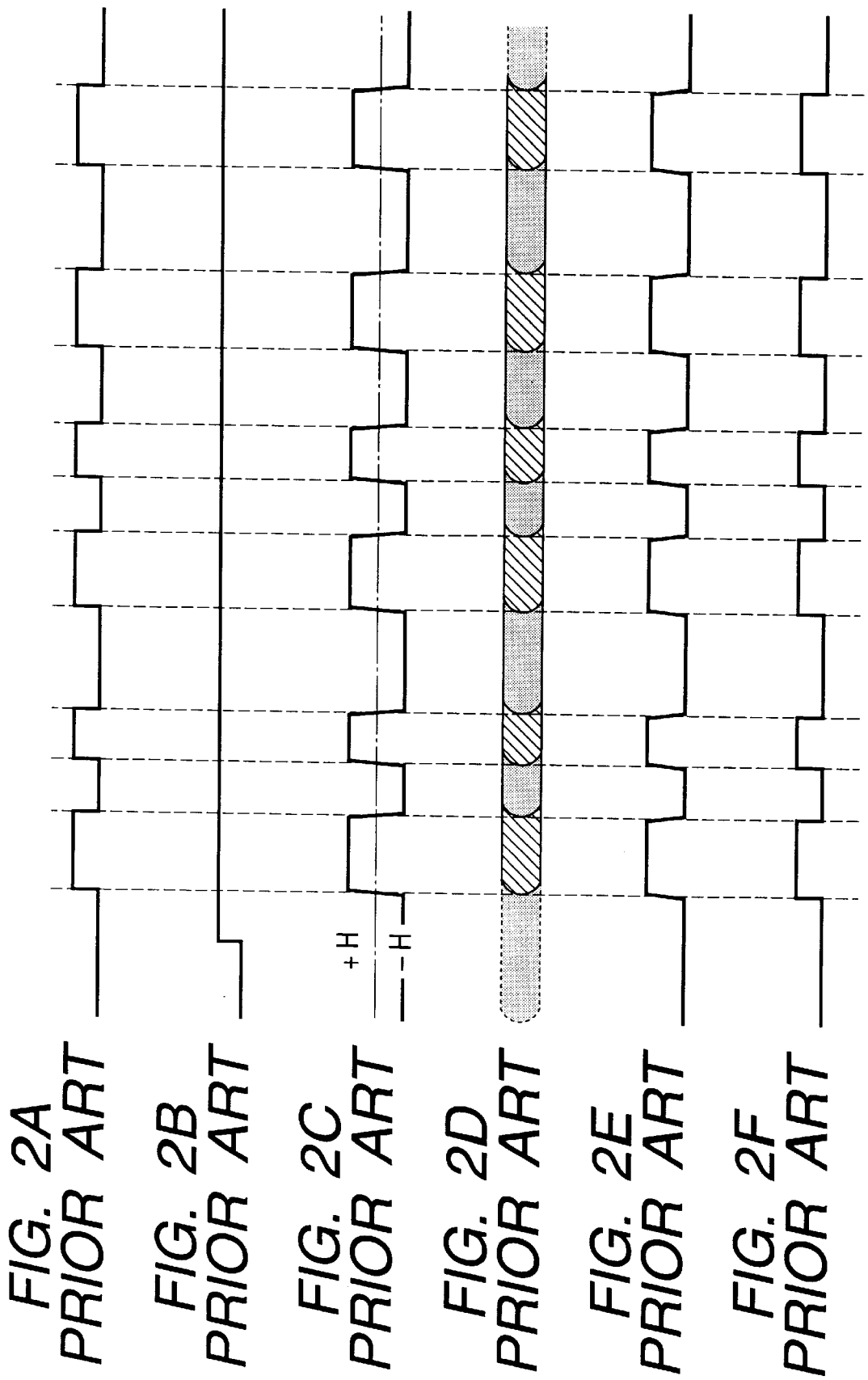
FIGS. 2A, 2B, 2C, 2D, 2E, and 2F are timing charts for explaining operation of a conventional magneto-optical recording-reproducing apparatus.
Figures 3A, 3B, 3C, 3D:
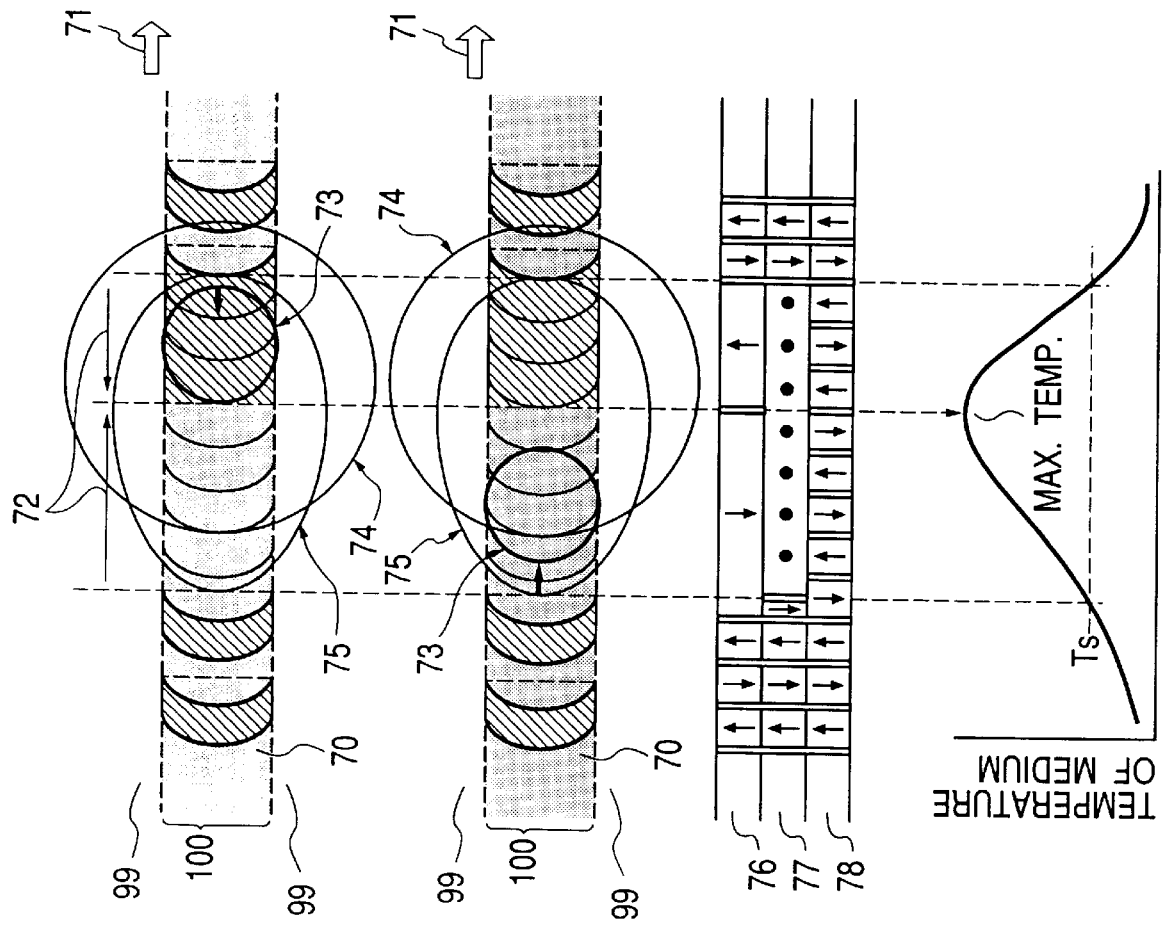
FIGS. 3A, 3B, 3C, and 3D show the principle of operation of a conventional magneto-optical recording-reproducing apparatus.
Figure 4:
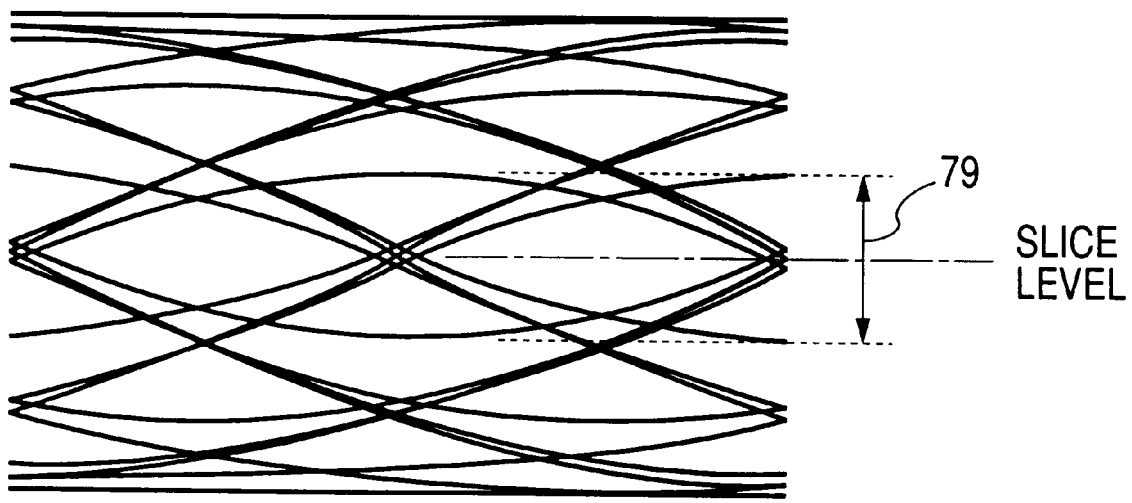
FIG. 4 shows the principle of eye pattern of binary digit conversion of a conventional magneto-optical recording-reproducing apparatus.
Figures 5A, 5B:
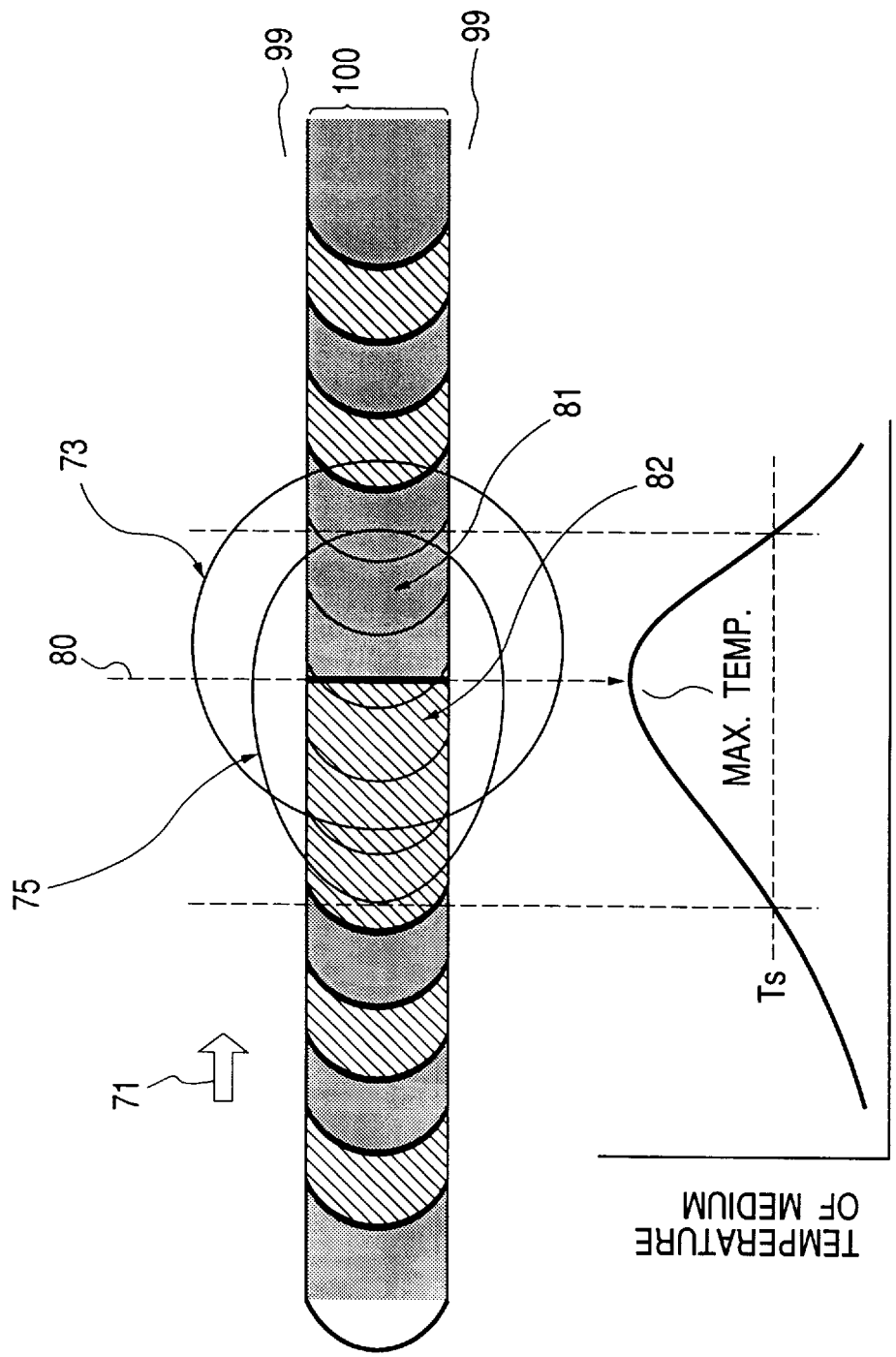
Figure 7:
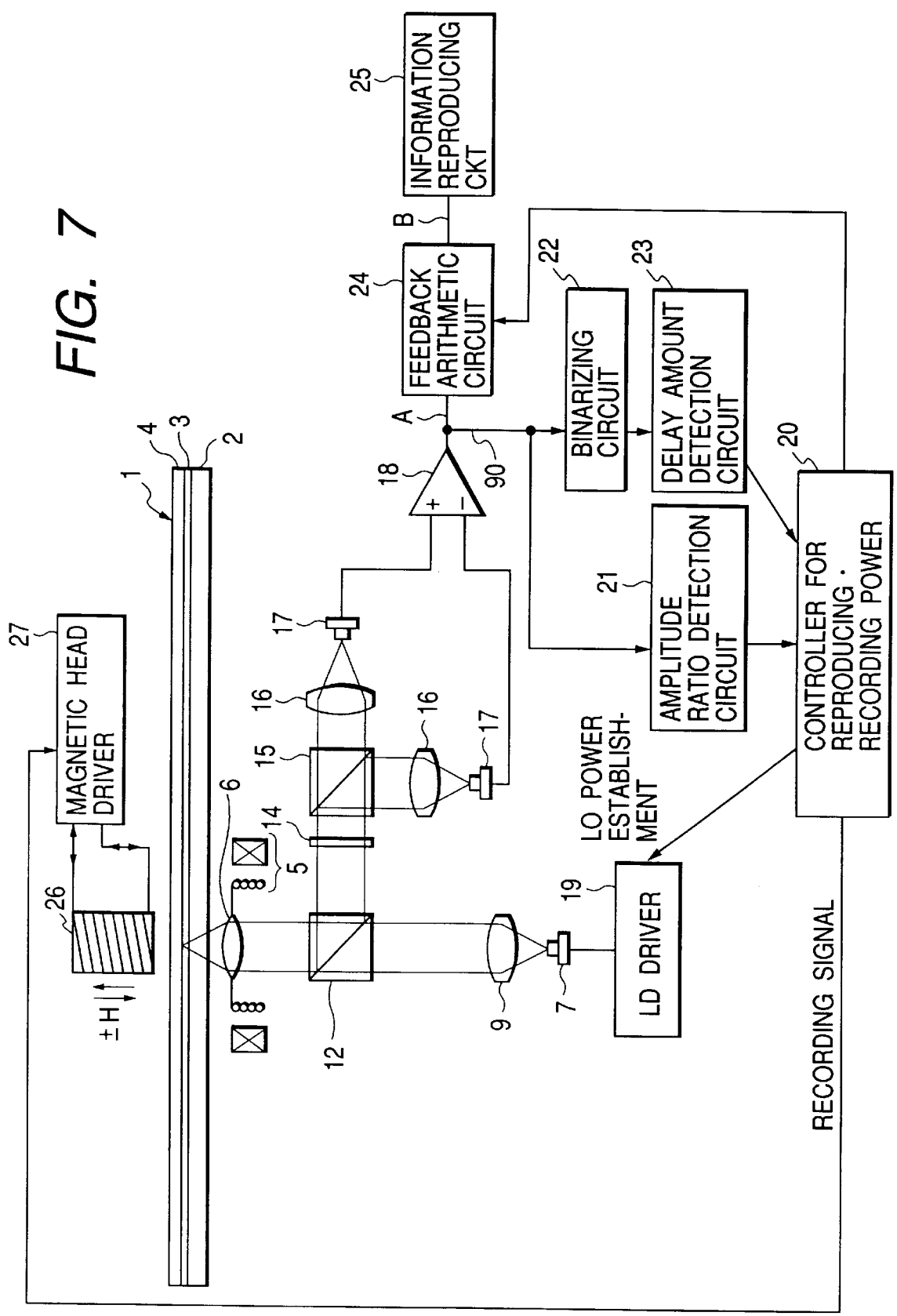
FIG. 7 shows constitution of a magneto-optical recording-reproducing apparatus of the present invention.

FIG. 7 shows constitution of a magneto-optical recording-reproducing apparatus of a first embodiment of the present invention. In FIG. 7, magneto-optical disk 1 is constituted of substrate 2 made from glass or a plastic material, a magneto-optical layer 3 formed thereon, and a protection layer 4 formed further thereon. Magneto-optical layer 3 is constituted of three layers comprising a memory layer, a switching layer, and a displacement layer, or two layers comprising a memory layer, and a displacement layer. Magneto-optical layer 3 is capable of reproducing record marks of less than light diffraction limit by causing displacement of a domain wall of a record mark in the displacement layer by utilizing temperature gradient formed by light beam irradiation without change of the recorded data in the memory layer, magnifying the magnetization in the reproducing spot, and detecting the change of the polarization direction of reflected light beam. Magneto-optical disk 1 is held by a spindle motor by magnet chucking or a like means to be rotatable on a rotation axis.

Parts 5 to 7, 9, and 12 to 17 constitute optical head for projecting a laser beam to magneto-optical disk 1 and receiving information from reflected light. The parts comprise condenser lens 6 as an objective lens; actuator 5 for driving condenser lens 6; semiconductor laser 7 for outputting a light beam; collimator lens 9 for parallelizing the light beam; beam splitter 12 for transmitting specified polarized light and reflecting another specified polarized light; λ/2 plate 14; polarized light beam splitter 15; photosensors 17 such as photodiodes, photo-transistors, MOS type photosensors, and BASIC photosensors; condenser lenses 16 for photosensors 17; differential amplification circuit 18 for amplifying differentially the condensed and detected signals in polarization directions.

In the above constitution, the laser beam emitted from semiconductor laser 7 is projected through collimator lens 9, beam splitter 12, and condenser lens 6 onto magneto-optical disk 1. Condenser lens 6 moves in the focusing direction and the tracking direction under control of actuator 5 to focus the laser beam successively on magneto-optical layer 3, and tracks along a guiding groove on magneto-optical disk 1. The laser beam reflected by magneto-optical disk 1 is deflected by beam splitter 12 to the optical path toward polarized light beam splitter 15, and travels toward λ/2 plate 14 and polarized light beam splitter 15. The light beam is split by the polarized light beam splitter 15 and the split light beams are focused by condenser lenses 16 onto photosensors 17 respectively in accordance with the magnetization polarity of the spots on magneto-optical layer 3. Each output of photosensors 17 is differentially amplified by differential amplifier 18, to output magneto-optical signals.

Controller 20 receives information on rotation rate of magneto-optical disk 1, recording radius, recording sectors, and so forth, and outputs recording power, and recording signals to control LD driver 19, magnetic head driver 27, and so forth. LD driver 19 drives semiconductor lasers 7 to control the recording power and reproduction power as desired in this embodiment.

Magnetic head 26 applies a modulating magnetic field onto the laser irradiation site on magneto-optical disk 1 in the recording operation. Magnetic head 26 is placed in opposition to condenser lens 6 with interposition of magneto-optical disk 1. In the recording onto magneto-optical disk 1, semiconductor laser 7 projects DC light as the recording laser power under control of LC driver 19, and synchronously magnetic head 26 produces magnetic fields of different polarities under control by magnetic head driver 27 in correspondence with the recording signals. Magnetic head 26 moves with the optical head in a radius direction of magneto-optical disk 1, and applies a magnetic field successively onto the laser irradiation site of magneto-optical layer 3 during recording.

Binarizing circuit 22 converts magneto-optical signals into binary digits for detection of the delay time. Delay time detection circuit 23 detects delay time β between binary signal pulses: one pulse produced by a signal generated by displacement of the domain wall from the front side of the critical magnetic-wall displacement temperature region to the maximum temperature point, f(t) (f(t)=0 at t<0), and another pulse produced by a signal generated by displacement of the domain wall from the rear side of the critical magnetic-wall displacement temperature region to the maximum temperature point, α·f(t−β) (f(t)=0 at t<0). Amplitude ratio detection circuit 21 detects the amplitude gain α of the amplitude f(t) to the amplitude α·f(t−β).

Feedback arithmetic circuit 24 comprises a delay circuit for delaying the signal for the delay time β detected by delay time detection circuit 23, an amplification circuit for giving amplitude gain α corresponding to amplitude ratio detected by amplitude ratio detection circuit 21, and a subtraction circuit for subtracting, from the original magneto-optical signals, the signal delayed for delay time β and giving gain α. The numeral 25 indicates an information reproducing circuit.

The operation principle of the present invention is described with the above constitution.

Figure 9A:
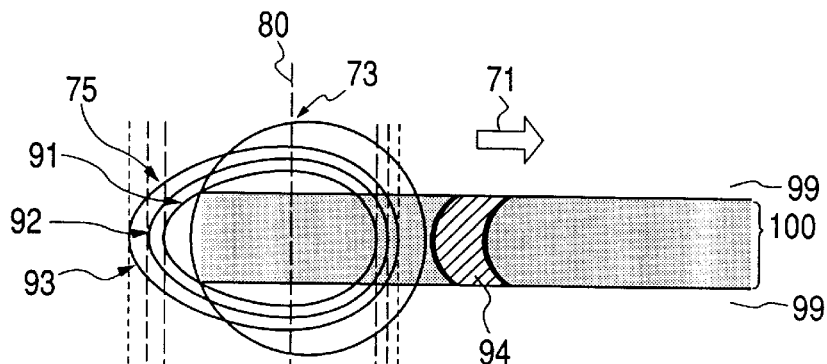
FIGS. 9A, 9B, 9C, 9D, and 9E show the principle of operation of a magneto-optical recording-reproducing apparatus of the present invention.
Figure 9B:
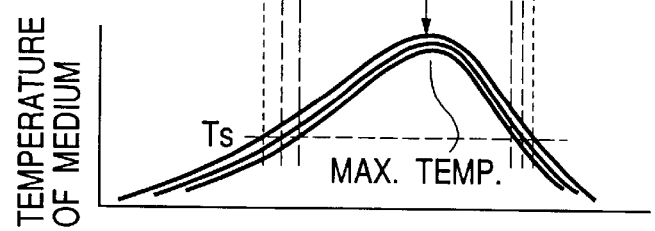

Firstly, the behavior of the reproducing signal in a domain wall displacing medium as the basis of the present invention and the principle of the present invention are explained by reference to FIGS. 9A to 9E. FIG. 9A shows temperature distribution caused by a reproducing light beam 73 moving from the left to the right as numeral 71 in the drawing for three levels of the reproducing power: reproducing power 91, reproducing power 92, and reproducing power 93. In FIG. 9A, the isotherm Ts 75 indicates the line connecting the points of the temperature for breaking the magnetic coupling between the memory layer for storing recorded information and the displacement layer capable of increasing a magnetic domain by displacing the domain wall. This temperature is the main factor for initiating the domain wall displacement. Basically, the domain wall will begin to be displaced when the domain wall is brought into this temperature range.

Figure 9C:
Figure 9D:
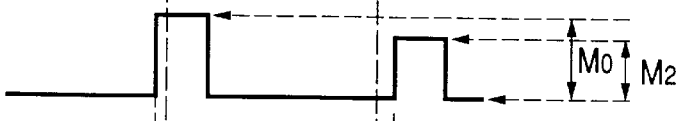

The position of the Ts isotherm relative to the light beam spot depends largely on the thermal characteristics of the recording medium, and also on the relative speed of the light beam to the recording medium. The domain wall having reached the Ts isotherm is displaced by the temperature gradient toward the maximum temperature point where it is most stable energetically. Further, as shown in the drawing, the domain walls are displaced to the maximum temperature point not only from the front side of the light beam-moving direction but also from the Ts isotherm at the rear side thereof. In reproduction of isolated record mark 94 shown in the drawing, reproduced signal of FIGS. 9C, 9D, or 9C is derived corresponding to the three levels of reproducing power: reproducing power levels 1, 2, and 3. The power levels are in the relation: (reproduction power 1)< (reproduction power 2)<(reproduction power 3).

The behavior of the reproduced signal is described below. With the movement of the light beam in the direction 71 shown in the drawing, the domain wall of the record mark is displaced at the front portion of the Ts temperature region in the front side of the light beam movement, giving a first rise of the signal wave. With further movement of the light beam, the domain wall of the record mark end portion is displaced, and the signal wave falls with disappearance of the magnetic domain in the displacement layer. When the displacing speed of the domain wall is sufficiently high in comparison with the light beam movement speed, the signal waveform is rectangular with quick rise and quick fall. With further movement of the light beam, when the rear portion of the Ts temperature region reaches the record mark, the magnetic domain in the memory layer is transferred to the displacement layer and simultaneously the domain wall is displaced toward the maximum temperature point to cause a second rise of the reproduced signal. The time of delay of the second signal rise corresponds to the time of the movement of the recording medium between the front end and the rear end of the Ts isotherm. With further movement of the light beam, the magnetic domain of non-record mark is transferred to the displacement layer, and simultaneously the domain wall is displaced. Then the light beam leaves the magnetic domain to offset the reproduced signal, finishing reproduction of the isolated record mark.

Figure 9E:
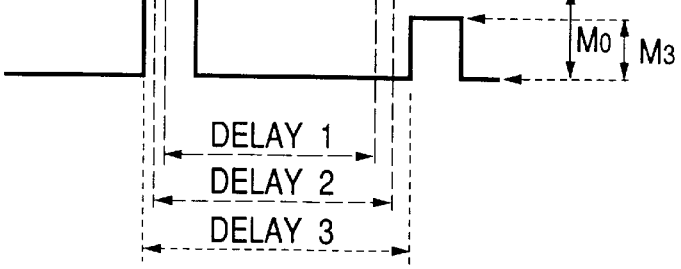

As shown above, the delay time between the first signal rise and the second signal rise depends on the size of the Ts temperature region. Therefore, the delay time is different among the three levels of the reproducing power as shown in FIGS. 9C to 9E. In the figures, amplitude $M_0$ means a reproduced signal amplitude by the domain wall displacement from the front side of the moving light beam; and amplitude $M_1$ means a reproduced signal amplitude by the domain wall displacement from the rear side of the moving light beam. The amplitude of the signal rise of the second signal relative to that of the first signal taken as 1 depends on the temperature distribution range in the light beam and the temperature dependence of the Kerr effect of the magneto-optical layer. From these phenomenon, when the signal component given by domain wall displacement from the front of the reproducing beam is represented by $f(t)$ ($f(t)=0$ at $t<0$), the signal component caused by domain wall displacement from the rear of the reproducing beam is represented by $\alpha \cdot f(t-\beta)$ ($f(t)=0$ at $t<0$), ($\beta$: delay time, $\alpha$: amplitude gain). The reproduced signal $h(t)$ is represented by the sum of these as a model: $h(t)=f(t)+\alpha \cdot f(t-\beta)$.

The delay time $\beta$ depends on the conditions for determining the temperature distribution on reproduction such as reproduction power, and linear velocity. The amplitude gain $\alpha$ is determined definitely by the delay time $\beta$.

The detection of the delay time $\beta$ is explained by reference to FIG. 7 and FIG. 10. The delay time $\beta$ is detected basically by the three functions of binarizing circuit 22, delay time detection circuit 23, and controller 20 shown in FIG. 7. The delay time $\beta$ may preliminarily be set as an inherent value of the recording medium. However, in consideration of variation of the reproduction power, combination of a magneto-optical recording-reproducing apparatus and a recording medium, and environmental conditions such as apparatus temperature, the delay time is preferably determined by reproduction test in a prescribed or assumed reproduction test region.

In this embodiment, a record mark pattern is reproduced in which isolated record marks are repeated at intervals of about twice the expected delay time $\beta$. The reproduction time of the record mark is herein represented by Tp. The reproduced signal of one isolated record mark involves two rectangular reproduction pulses as shown in FIGS. 9A to 9E. This reproduced signal is converted to binary digit at a prescribed slice level by binarizing circuit 22, and is inputted to delay time detection circuit 23. The method of the binary-digit conversion is not limited thereto, and may be zero-cross detection by second differential derivative.

Figure 10:
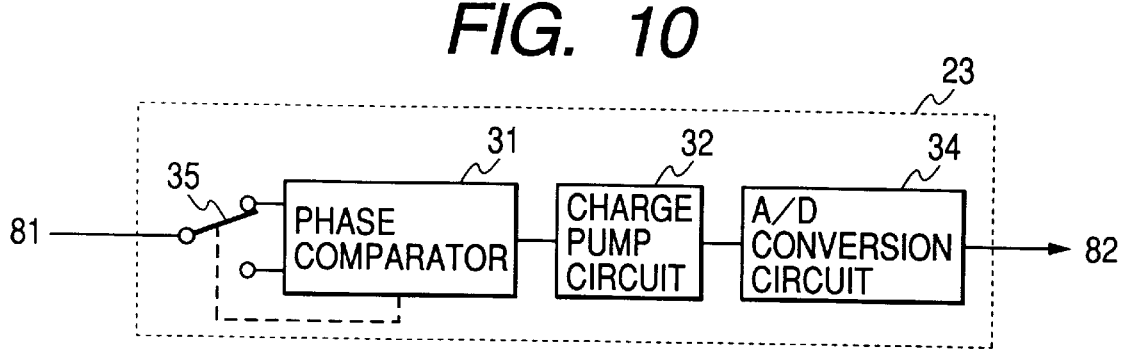
FIG. 10 shows constitution of the delay detection circuit in FIG. 7.

FIG. 10 shows an outline of the constitution of delay time detection circuit 23. The operation thereof is explained below. Delay time detection circuit 23 is mainly constituted of a phase comparator circuit 31, charge pump circuit 32, and additionally A/D conversion circuit 34. Binary digit signal 81 from binarizing circuit 22 is inputted to phase comparator 31, where the time phases of the rise of the signal (odd number order) generated by the domain wall displacement from the front portion of the critical temperature region to the maximum temperature point caused by light beam are compared with the time phase of the rise of the signal (even number order) generated by the domain wall displacement from the rear portion of the critical temperature region to the maximum temperature point.

In the comparison, the reproduced pulses of odd number order and the ones of even number order are respectively introduced to the input terminals of phase comparison circuit 31 by switching with switch 35. There, phase comparison is conducted from the odd number order pulse sequence to the even number order pulse sequence. The timing data of the phase comparison is converted into voltage information by charge pump 32. Since the output voltage of charge pump 32 depends definitely on the phase difference time by fixing the circuit constants, etc., the voltage information can be treated as time data. The voltage information is treated for A/D conversion by A/D conversion circuit 34. The treated information is introduced to controller 20 as the delay time information corresponding to delay time β. (This is shown by the numeral 82 in the drawing.) The delay time β relates definitely to the reproducing power as shown in FIGS. 9C to 9E. However, it depends on the reproducing power of the recording-reproducing apparatus, characteristics of the light beam, the difference of focus servo state, the environmental temperature, and so forth. Therefore, in consideration of variation in combination of the recording-reproducing apparatus and the recording medium, the delay time is preferably decided finally by repeated detection of the delay time.

Figure 11:
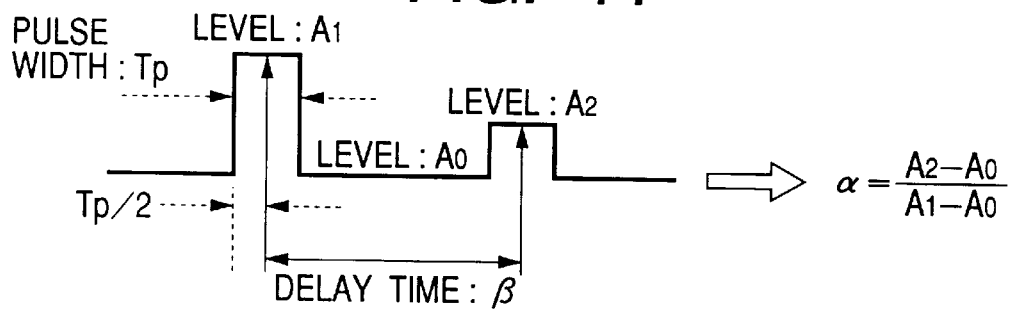
FIG. 11 shows constitution of the amplification ratio-detecting circuits in FIG. 7.

Subsequently to the detection of delay time β, the ratio of the amplitudes of the two reproduced pulse in the reproduction of isolated waveforms is detected by amplitude ratio detection circuit 21 in FIG. 7. An example of amplitude ratio detection operation is shown in FIG. 11. In FIG. 11, of the two pulses mentioned above, reproduced signal A1 is sampled at a time of Tp/2 after the rise of the odd-number ordered pulse signal generated by the displacement of the domain wall from the front portion of the critical domain wall displacement temperature region to the maximum temperature point. Subsequently, after the delay time β having been measured as above, reproduced signal A2 is sampled from even-number ordered pulse signal generated by the displacement of the domain wall from the rear portion of the critical domain wall displacement temperature region to the maximum temperature point. The sampled data are subjected to A/D conversion, and therefrom the amplitude gain $\alpha=(A2-A0)/(A1-A0)$ is calculated (where A0 is the base voltage).

Figure 12:
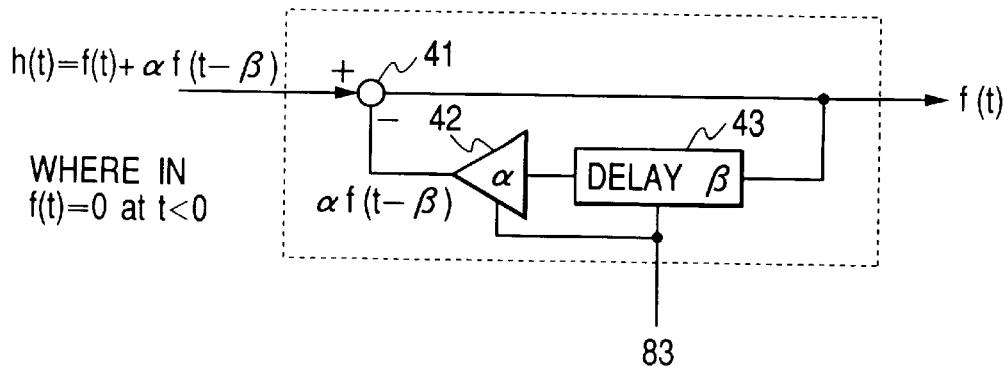
FIG. 12 shows constitution of the feedback arithmetic circuit in FIG. 7.

As described above, feedback computing is conducted by detecting delay time β and amplitude gain α, and employing the constitution shown in FIG. 12. Feedback arithmetic circuit 24 is constituted of variable delay circuit 43, variable amplitude amplifier 42, and differential amplifier 41. In FIG. 12, the numeral 83 indicates control signal from the controller. Variable delay circuit 43 for analog signal reproduction is constituted of analog delay lines having plural taps, or the like, or the one for digital signal reproduction is constituted of programmable delay lines, or the like. Variable amplitude amplifier 42 may be an operation amplifier capable of varying the gain by a control signal. Thus, the magneto-optical signal is delayed for the delay time (β delay), and the amplitude is multiplied by α. The treated signal is fed back and subtracted from the original magneto-optical signal h(t).

In the equation $h(t)=f(t)+\alpha \cdot f(t-\beta)$, the value of f(t) cannot be derived for the entire time axis from the equation. However, f(t) is a signal generated from the start of the reproduction, namely the start of recording, and is a casual function. Therefore, $f(t-\beta)=0$ at $t<\beta$ under the condition of $f(t)=0$ at $t<0$. Accordingly, in actual recording-reproduction system, when no record mark exists to the time of "−β" (time β toward the start of reading), $h(t)=f(t)$, $t<\beta$ for the time from the start of reading to $t<\beta$. There, only the signal is reproduced which is generated by displacement of the domain wall caused by the light beam from the front portion of the critical domain wall displacement temperature region to the maximum temperature point.

As mentioned above, successive treatment for delay of the time (β delay), multiplication of the amplitude by α, and subtraction of the treated signal from original magneto-optical signal h(t) gives f(t) only without $\alpha \cdot f(t-\beta)$ which is generated by the domain wall displacement from the rear portion to the maximum temperature point.

This phenomenon is described briefly by reference to FIGS. 13A to 13D. FIG. 13A illustrates a record mark sequence, which has non-recorded regions of reproduction time of >β. In this explanation, the non-recorded regions are assumed to correspond respectively to 1.5β as shown by the numeral 85. A light beam is allowed to scan the record mark sequence in direction of arrow 71 to displace the domain wall in the record mark in the displacement layer without changing the recorded data in the memory layer by utilizing the temperature gradient in temperature distribution. The record mark is detected by detecting the change of polarization direction of the reflected light beam. In this detection, are recognized the reproduction signals shown in FIG. 13B caused by the domain wall displacement from the front portion of the critical domain wall displacement temperature region to the maximum temperature point, and other reproduction signals shown in FIG. 13C caused by the domain wall displacement from the rear portion of the critical domain wall displacement temperature region to the maximum temperature point. The synthesized signals shown in FIG. 13D are detected which are composed of the reproduced signals of FIG. 13B and the one of FIG. 13C.

The reproduced signal immediately after the non-recorded region should be noted. It does not contain the signal $\alpha \cdot f(t-\beta)$, which is generated by the displacement of the domain wall from the rear side of the light beam movement to the maximum temperature point, after the time β as shown in FIG. 13B. That is, in the time of $t<\beta$ from the start of reading immediately after the non-recorded region, only the signal f(t) is reproduced which is generated by the magnet wall displacement from the front side of the critical domain wall displacement temperature range to the maximum temperature point. Therefore, the reading is started from immediately after the non-recorded region, and successively the treatment is conducted in which after the delay time β the amplitude multiplied by α is fed back and the treated signal is subtracted from the original magneto-optical signal. By this treatment, f(t) only can be taken out as the reproduced signal without the signal $\alpha \cdot f(t-\beta)$ which is generated by domain wall displacement from the rear portion to the maximum temperature point.

However, with this technique, once a reading error is caused in the original signal h(t), the error is propagated successively inconveniently. Therefore, a region of no record mark of longer than the time β or more is preferably provided before the resynchronizing region for preventing the propagation of the error in decoding of the modified signal in ordinary recording medium. The frequency and the interval of the recyncronizing regions are selected optimally in consideration of the reading error frequency, kinds of treated data, and the system employed.

Practical recording and reproduction of information are explained by reference to timing charts of FIGS. 8A to 8G. FIG. 8A shows a recording signal sequence. FIG. 8B shows recording power higher than reproducing power. FIG. 8C shows a modulating magnetic field. FIG. 8D shows a record mark sequence. FIG. 8E shows reproduced signals at point A in FIG. 7. FIG. 8F shows reproduced signals at point B in FIG. 7. FIG. 8G shows a reproduced data sequence.

With the start of the recording, controller 20 inputs a recording data sequence of the recording signals shown in FIG. 8A with application of prescribed recording laser power shown in FIG. 8B, and application of magnetic field for modulation shown in FIG. 8C from magnetic head 26. Thereby, record mark sequence shown in FIG. 8D is formed in the process of cooling of the recording medium after the passage of the light beam. In FIG. 8D, the slash-shadowed portions show magnetic domains magnetized in the direction corresponding to the record mark in the present invention, and the dot-shadowed portions show magnetic domains magnetized in the reverse direction. In accordance with the record mark sequence, the domain walls of the record marks in the displacement layer are displaced without change of the recorded data in the memory layer by utilizing the temperature gradient in temperature distribution caused by the temperature characteristics of the recording medium for the magnetic domains in magneto-optical layer 3. The record marks are reproduced by an magneto-optical record-reproduction technique by detecting the change of the polarization direction of the reflected light beam to obtain reproduced signal h(t) as shown in FIG. 8E. For treatment of the reproduced signals, are applied the predetected delay time $\beta$, and signal amplification ratio $\alpha$ for characterizing the signal component $\alpha \cdot f(t-\beta)$. The reproduced signal shown in FIG. 8E is delayed for the delay time $\beta$. and the amplitude is multiplied by $\alpha$, and the treated signal is fed back and subtracted from the original reproduced signal shown in FIG. 8E. By repeating this treatment successively, reproduced signals are obtained as shown in FIG. 8F. For this treatment, regions having no record mark corresponding to the time longer than the delay time $\beta$ are provided before the read-starting point and resink regions.

The reproduced signals obtained in this embodiment can be converted to binary digit signals according to conventional technique such as edge detection by level slice, and channel sampling detection to obtain a reproduced data sequence as shown in FIG. 8G.

In the above embodiment, the delay time $\beta$ and detected amplitude ratio $\alpha$ will vary with variation of the magneto-optical layer, the spindle motor rotation, power source voltage, environmental state such as temperature and humidity, and so forth. However, as delay circuit 43 and variable amplifier 42 can be successively controlled by controller 20 as shown in FIG. 12, the reproduced output signals from feedback arithmetic circuit 24 are detected with sufficient margins corresponding the recorded data.

Although this embodiment is described for magnetic field modulation recording with DC laser light beam irradiation, the recording method is not limited thereto. The present invention is applicable to magnetic field modulation recording with magnetic field modulation plus pulse laser beam irradiation, or optical modulation recording.

The present invention relates to magneto-optical recording-reproducing method in which a light beam is projected to a magneto-optical medium having a multi-layer structure, thereby a domain wall of a record mark in the displacement layer is displaced without change of the recorded data in the memory layer by utilizing temperature gradient of temperature distribution, and the change of polarization direction of the reflected light beam is detected to reproduce record marks of less than light diffraction limit. This magneto-optical recording-reproducing method is characterized in that a synthesized signal, $h(t)=f(t)+\alpha \cdot f(t-\beta)$, composed of a signal f(t) (f(t)=0 at t<0) generated by domain wall displacement from the front portion of the critical domain wall displacement temperature range produced by the light beam, and a signal $\alpha \cdot f(t-\beta)$ (f(t)=0 at t<0) generated by domain wall displacement from the rear porion of the critical domain wall displacement temperature range are detected; signal delay time $\beta$ between the signal from the front side of the light beam and the signal from the rear side of the light beam is detected; the signal amplitude gain $\alpha$ of the amplification of the signal from the front portion of the moving light beam to that from the rear portion thereof is detected; a signal obtained by delaying the above synthesized signal h(t) by the detected delay time $\beta$, and multiplying it by $\alpha$ is fed back and subtracted from the original signal h(t), whereby a signal f(t) only is formed which is generated by the domain wall displacement from the front portion of the critical domain wall displacement temperature range formed by the light beam to the maximum temperature point to reproduce the information from this signal. The method and apparatus enable omission of the heating beam and related parts, decrease of the steps of the apparatus assemblage, and cost saving with the one laser system.

In the one-beam reproduction system, the reproduced signal is a synthesis signal of $h(t)=f(t)+\alpha \cdot f(t-\beta)$ which is composed of a signal f(t) generated by displacing of the domain wall from the front side of the critical domain wall displacement temperature range toward the maximum temperature point in the higher temperature range caused by light beam 73, and a signal $\alpha \cdot f(t-\beta)$ generated by displacement of the domain wall from the rear side of the critical domain wall displacement temperature range toward the maximum temperature point. The conventional technique in which the median of repeated amplitudes of minimum mark repetition is taken as the slice level and is converted to binary digit has disadvantage that the recorded information cannot reproduced with sufficient margin. The present invention offsets the above disadvantage of the conventional technique. According to the present invention, the inherently necessary signal f(t) only is formed which is generated by displacement of domain wall from the front side of the critical domain wall displacement temperature range to the maximum temperature point, thereby the recorded information can be precisely reproduced even with conventional binary digit conversion technique.

What is claimed is:

1. A method for reproducing information on a magneto-optical medium comprising causing temperature distribution on the magneto-optical medium by projection of a light beam and displacing domain walls by the temperature gradient, wherein a detected reproduction signal is corrected by subtraction therefrom of a signal derived by delaying the detected reproduction signal by a prescribed time $\beta$ and multiplying the delayed signal by an amplitude gain $\alpha$.

2. The method for reproducing information according to claim 1, wherein the reproduced signal is a synthesized signal $h(t)=f(t)+\alpha \cdot f(t-\beta)$ composed of a first reproduced signal f(t) (f(t)=0 at t<0) generated by domain wall displacement from a front portion of the movement of the light beam and a second reproduced signal $\alpha \cdot f(t-\beta)$ (f(t)=0 at t<0) generated by domain wall displacement from a rear portion of the movement of the light beam.

3. The method for reproducing information according to claim 2, wherein a non-record region satisfying at least the condition of (reproduction time)>$\beta$ is provided before the top of the information.

4. The method for reproducing information according to claim 2, wherein a non-record region satisfying at least the condition of (reproduction time)>$\beta$ is provided before the resynchronizing region formed between portions of the information.

5. The method for reproducing information according to claim 2, wherein the parameters $\alpha$ and $\beta$ are derived by reproducing an isolated mark provided in a special region of said magneto-optical medium.

6. An apparatus for reproducing information on a magneto-optical medium comprising causing temperature distribution on the magneto-optical medium by projection of a light beam, and displacing domain walls by the temperature gradient, wherein the apparatus comprises a first circuit for generating reproduced signals from reflection of the light beam, a second circuit for generating a modified signal derived by delaying the reproduction signal by a prescribed delay time $\beta$ and multiplying an amplitude gain $\alpha$, and a third circuit for subtracting the modified signal from the reproduced signal.

7. The apparatus for reproducing information according to claim 6, wherein the reproduced signal is a synthesized signal $h(t)=f(t)+\alpha \cdot f(t-\beta)$ composed of a first reproduced signal $f(t)$ ($f(t)=0$ at $t<0$) generated by domain wall displacement from a front portion of the movement of the light beam and a second reproduced signal $\alpha \cdot f(t-\beta)$ ($f(t)=0$ at $t<0$) generated by domain wall displacement from a rear portion of the movement of the light beam.

* * * * *

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COVER PAGE

Item [56], References Cited, U.S. PATENT DOCUMENTS,

Below line 2, insert the following references:

--5,459,701　　10/1995　　Tokita et al.　　.... 369/13--, and

--5,539,718　　7/1996　　Hoshi et al.　　.... 369/100--.

Item [57], ABSTRACT,

Line 2, "causing" should read --causing a--;

and

Line 3, "the temperature" should read --a temperature--.

COLUMN 1

Line 12, "change of" should read --changing--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 1 (continued)

Line 13, "temperature" should read --a temperature--, and "tempera- " should read --a tempera- --;

Line 16, "light" should read --a light--;

Line 20, "mediums" should read --media--;

Line 26, "magneto- " should read --a magneto- --;

Line 40, "is" should read --are--;

Line 48, "is" should read --are--;

Line 51, "heating" should read --a heating--;

Line 54, "detecting" should read --and detecting--;

and

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 1 (continued)

Line 57, "frequency" should read --a frequency--, and "optical" should read --an optical--.

COLUMN 2

Line 1, "optical" should read --the optical--;

Line 3, "temperature" should read --a temperature--;

Line 17, "wavelength" should read --a wavelength--; and

Line 66, "driver" should read --driver 19--.

COLUMN 3

Line 1, "modulation" should read --modulating--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 3 *(continued)*

Line 25, "modulating" should read --a modulating--;

Line 27, "record" should read --a record--;

Line 28, "memory" should read --the memory--;

Line 34, "groove," should read --a groove--;

Line 35, "land" should read --a land--; and

Line 58, "temperature" should read --a temperature--.

COLUMN 4

Line 5, "indiates" should read --indicates--;

Line 10, "two" should read --a two--;

Line 11, "is" should read --are--;

Line 12, "one" should read --a one--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 4 (continued)

Line 14, "light" should read --the light--;

Line 20, "temperature" should read --a temperature--;

Line 37, "superposition" should read --a superposition--;

Line 42, "sufficient" should read --a sufficient--;

Line 43, "technique" should read --techniques--;

Line 54, "an" should read --on--; and

Line 55, "temperature" should read --a temperature--.

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 5

Line 7, "constitution" should read --a constitution--;

Line 16, "eye" should read --an eye--;

Line 22, "constitution" should read --a constitution--;

Line 31, "constitution" should read --a constitution--;

Line 33, "constitution" should read --a constitution--;

Line 35, "constitution" should read --a constitution--;

Line 46, "constitution" should read --a constitution--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA

Page 7 of 14

It is certified that error appears in the above-identified patent and that said Letters Patent is hereby corrected as shown below:

COLUMN 5 *(continued)*

Line 61, "reflected" should read --a reflected--;

and

Line 65, "optical" should read --an optical--.

COLUMN 6

Line 67, "amplitude" (second occurrence) should read --an amplitude--.

COLUMN 7

Line 11, "temperature" should read --a temperature--;

Line 35, "reproduced" should read --a reproduced--, and "9C" (second occurrence) should read --9E--; and Line 61, "non-record" should read --a non-record--.

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 8

Line 12, "phenomenon" should read --phenomena--;

Line 30, "variation" should read --a variation--, and "combina- " should read --a combina- --;

Line 42, "binary" should read --a binary--;

Line 46, "zero-cross" should read --a zero-cross--, and "second" should read --a second--; and Line 57, "light" should read --the light--.

COLUMN 9

Line 15, "variation" should read --a variation--;

Line 18, "Subsequently" should read --Subsequent--;

Line 19, "pulse" should read --pulses--;

Line 21, "amplitude" should read --an amplitude--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 9 (continued)

Line 30, "even-number" should read --an even-number--; and

Line 58, "actual" should read --an actual--.

COLUMN 10

Line 1, "original" should read --an original--;

Line 11, "direction" should read --a direction--;

Line 14, "temperature" (second occurrence) should read --the temperature--;

Line 17, "are recognized" should be deleted;

Line 24, "point." should read --point are recognized.--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 10 (continued)

Line 47, "is" should read --is inconveniently--;

Line 48, "inconveniently" should be deleted;

Line 52, "ordinary" should read --an ordinary--; and

Line 53, "recyncronizing" should read --resynchronizing--.

COLUMN 11

Line 1, "magnetic" should read --a magnetic--;

Line 3, "record" should read --a record--;

Line 13, "temperature" (second occurrence) should read --the temperature--;

Line 16, "an" should read --a--;

Line 20, "are applied" should be deleted;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA Page 11 of 14

It is certified that error appears in the above-identified patent and that said Letters Patent is hereby corrected as shown below:

COLUMN 11 (continued)

Line 22, "$-\alpha \cdot f(t-\beta)$" should read $--\alpha \cdot f(t-\beta)$ are applied--;

Line 23, "$\beta$." should read $--\beta,--$;

Line 33, "technique" should read --techniques--;

Line 44, "corresponding" should read --corresponding to--;

Line 51, "to" should read --to a--;

Line 56, "temperature" should read --a temperature--;

Line 57, "temperature" should read --a temperature--; and

Line 59, "light" should read --a light--.

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 12

Line 1, "signal" (first occurrence) should read --a signal--;

Line 29, "binary" should read --a binary--, and "disadvantage" should read --the disadvantage--;

Line 30, "cannot" should read --cannot be--;

Line 34, "domain" should read --a domain--; and

Line 37, "with" should read --with a--.

Line 40, "temperature" should read --a temperature--;

Line 42, "the" should read --a--;

Line 51, "a front" should read --a movement of a front--, and "movement of the" should read --projected--;

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 12 *(continued)*

Line 58, "top" should read --beginning--; and

Line 61, "the" should read --a--.

COLUMN 13

Line 2, "causing" should read --causing a--;

Line 4, "the" should read --a--; and

Line 8, "reproduction" should read --reproduced--.

UNITED STATES PATENT AND TRADEMARK OFFICE
CERTIFICATE OF CORRECTION

PATENT NO. : 5,953,289
DATED : September 14, 1999
INVENTOR(S) : YASUYUKI MIYAOKA It is certified that error appears in the above-identified patent and that said Letters Patent is hereby corrected as shown below:

COLUMN 14

Line 5, "a front" should read --a movement of a front--, and "movement of the" should read --projected--.

Signed and Sealed this

Twenty-seventh Day of February, 2001

Attest:

NICHOLAS P. GODICI

Attesting Officer    Acting Director of the United States Patent and Trademark Office